United States Patent [19]

Hyodo et al.

[11] Patent Number: 4,553,621
[45] Date of Patent: Nov. 19, 1985

[54] AUTOMOBILE SPEED CONTROL SYSTEM

[75] Inventors: Hitoshi Hyodo, Okazaki; Naoji Sakakibara, Chiryu; Shoji Kawata, Okazaki, all of Japan

[73] Assignee: Aisin Seiki Kabushiki Kaisha, Okazaki, Japan

[21] Appl. No.: 534,463

[22] Filed: Sep. 21, 1983

[30] Foreign Application Priority Data

Sep. 21, 1982 [JP] Japan ................................ 57-165274
Sep. 21, 1982 [JP] Japan ................................ 57-165275
Sep. 21, 1982 [JP] Japan ................................ 57-165277

[51] Int. Cl.⁴ ........................................... B60K 31/00
[52] U.S. Cl. .................................. 180/179; 123/352; 364/426
[58] Field of Search ....................... 180/176, 178, 179; 123/350, 352; 364/426

[56] References Cited

U.S. PATENT DOCUMENTS

| 4,202,424 | 5/1980 | Sakakibara et al. | 180/176 |
| 4,328,776 | 5/1982 | Kuno et al. | 180/179 X |
| 4,434,469 | 2/1984 | Suzuki et al. | 180/179 X |
| 4,451,888 | 5/1984 | Kuno et al. | 180/179 X |
| 4,463,822 | 8/1984 | Tanigawa et al. | 180/179 X |

Primary Examiner—Joseph F. Peters, Jr.
Assistant Examiner—Michael Mar
Attorney, Agent, or Firm—Sughrue, Mion, Zinn, Macpeak and Seas

[57] ABSTRACT

An automobile speed control system has a comparator circuit for issuing a speed difference signal when there is a difference between an automobile speed signal indicative of an automobile speed and an automobile speed setting signal indicative of a desired speed setting, an actuator responsive to the speed difference signal for adjusting the opening of a throttle valve to change the speed of an automobile in order to eliminate the speed difference signal, a cancel switch for cancelling a constant-speed travel mode of the automobile, a resume switch for resuming the constant-speed travel mode which has been cancelled, a timer circuit energizable for a prescribed interval of time in response to operation of the resume switch while the automobile is running in the constant-speed travel mode, and an acceleration signal generator circuit for generating an acceleration signal in response to operation of the resume switch while the timer circuit is in operation, whereby the acceleration signal can be produced to increase the speed of the automobile when the resume switch is actuated.

4 Claims, 1 Drawing Figure

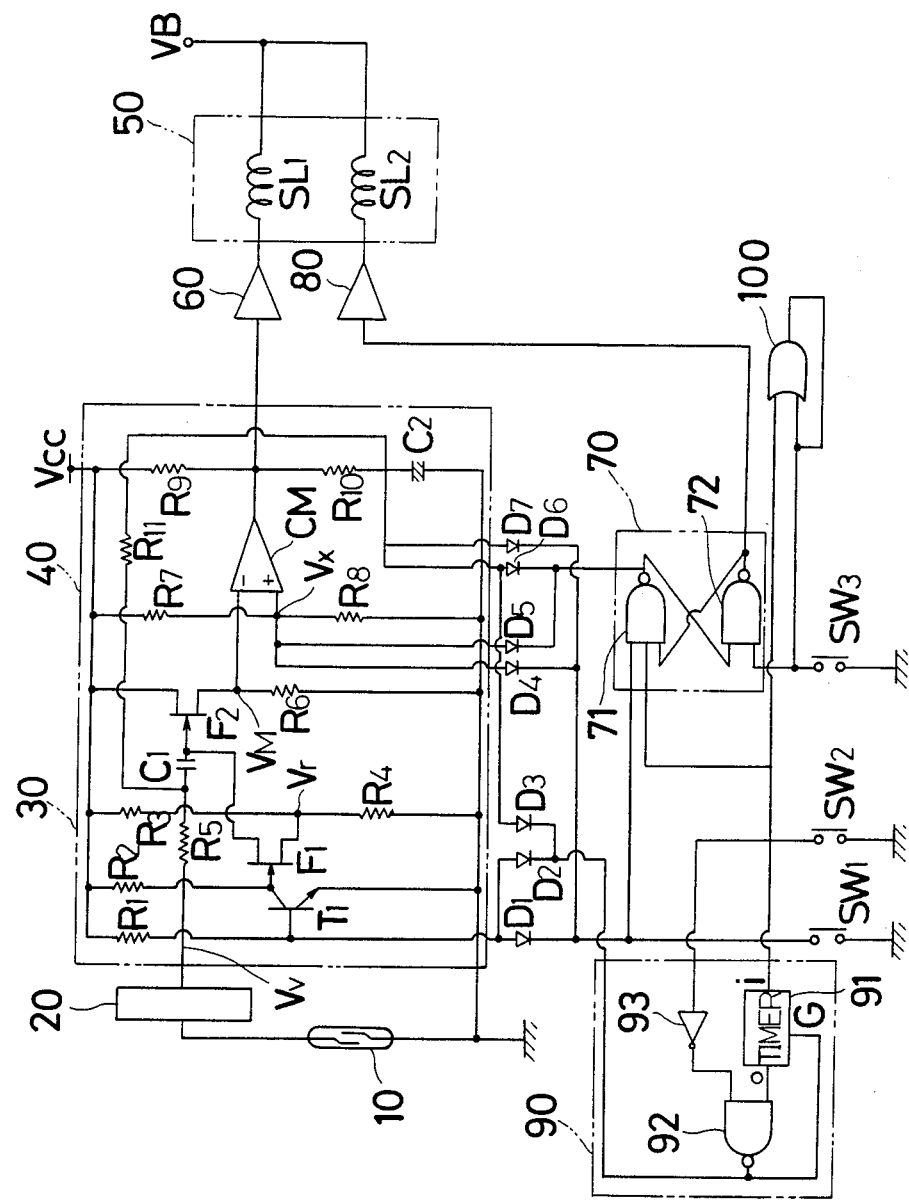

AUTOMOBILE SPEED CONTROL SYSTEM

BACKGROUND OF THE INVENTION

1. Field of the Invention

The present invention relates to an automobile speed control system for setting, memorizing and cancelling desired target speeds in an apparatus for enabling an automobile to travel at a desired constant target speed.

2. Description of the Prior Art

Automobile speed control systems of the type described above detect an actual automobile speed as a number of pulses and produce as a speed signal an analog voltage proportional to the number of pulses generated. When the automobile as it runs has reached a desired speed, the driver turns on a constant-speed travel setting switch to enable a memory circuit to set or store the speed signal at that time. The speed control system includes a comparator to which there are applied a reference voltage indicative of the set speed signal and a voltage representative of the current speed of the automobile. The speed control system adjusts the opening of the throttle valve in order to eliminate any difference between the reference voltage and the actual-speed voltage.

The automobile speed control systems have a deceleration setting function for allowing the automobible speed to slow down gradually as long as the driver pushes or closes the constant-speed travel setting switch after the automobile has run at a constant speed, and for bringing the automobile into a constant-speed travel mode by enabling the memory circuit to store the automobile speed available at the instant the setting switch is opened. Some speed control systems also include a "tap-up" function for causing the automobile speed to increase slightly when the driver momentarily actuates the setting switch while the automobile is running at a constant speed. Therefore, the automobile can be decelerated as long as the setting switch is depressed and be accelerated when the setting switch is operated upon momentarily.

With the tap-up function, however, the automobile speed increases only a small fraction ranging from 1 to 5 km/h each time the setting switch is flipped. When it is desired to increase the car speed to a great extent, the driver is required to actuate the setting switch repeatedly. Thus, the operation for a speed increase is awkward and it takes a long period of time for the automobile to reach a desired speed through the operation of the setting switch.

The apparatus for controlling the automobile to run at a desired constant speed is normally arranged such that the constant-speed travel mode is automatically released or disabled for safety purpose when a brake pedal is depressed while the automobile is running in that constant-speed travel mode. The apparatus is equipped with a resume switch for enabling the automobile to regain the previously memorized speed after the brake pedal has been released.

SUMMARY OF THE INVENTION

It is an object of the present invention to provide an automobile speed control system for enabling a resume switch to increase the automobile speed while the automobile is running at a constant speed.

The above object can be achieved by providing a timer circuit energizable for a prescribed interval of time in response to operation of a resume switch while an automobile is running at a constant speed, and an acceleration signal generator circuit for generating an acceleration signal in response to operation of the resume switch while the timer circuit is being energized, so that an acceleration signal can be produced by actuating the resume switch for thereby increasing the automobile speed.

With this arrangment, when the automobile is to be accelerated while running at a constant speed, the driver actuates the resume switch, and the automobile speed continues to increase as long as the resume switch is pushed. When the resume switch is turned off at the time the automobile has reached a desired speed, the automobile is now brought into a constant-speed travel mode. The present invention is practically advantageous in that the automobile speed control system can be realized simply by adding only few components to an existing apparatus for controlling an automobile to travel at constant speeds.

The above and other objects, features and advantages of the present invention will become more apparent from the following description when taken in conjunction with the accompanying drawing in which a preferred embodiment of the present invention is shown by way of illustrative example.

BRIEF DESCRIPTION OF THE DRAWING

The sole FIGURE is a circuit diagram of an automobile speed control system according to the present invention.

DESCRIPTION OF THE PREFERRED EMBODIMENT

The present invention is particularly useful when embodied in an automobile speed control system as shown in the sole FIGURE.

A reed switch 10 is alternately openable and closable by a permanent magnet (not shown) which rotates at the same speed as that of a speedometer cable attached to an automobile cable. The reed switch 10 as it operates produces an automobile speed signal having a frequency which is converted into a corresponding voltage by a frequency-to-voltage (F/V) converter 20.

A target speed memory circuit 30 serves to store a voltage corresponding to a speed voltage signal $V_V$ (actual speed signal) from the F/V converter 20 in response to operation of a setting switch SW1, and issues a stored voltage signal $V_M$ variable with the speed voltage signal $V_V$ across the voltage thus stored. The memory circuit 30 includes an input resistor $R_5$, a storage capacitor $C_1$, and an impedance conversion FET $F_2$ which are connected in series with each other, the FET $F_2$ having a drain connected to a constant-voltage source Vcc and a source grounded through a resistor $R_6$. Analog switching FET $F_1$ has a drain connected to the gate of the impedance conversion FET 2 and a source to which there is applied a voltage obtained by dividing the constant voltage Vcc with resistors $R_3$, $R_4$. The gate of the FET $F_1$ is connected through a resistor $R_2$ to the contant-voltage source Vcc and the collector of a transistor $T_1$. The transistor $T_1$ has a base coupled through a resistor $R_1$ to the constant-voltage source Vcc and through a diode $D_1$ to the setting switch $SW_1$.

A comparator circuit 40 has a comparator CM including an inverting input terminal (−) to which the stored voltage signal $V_M$ is applied and a noninverting input terminal (+) to which there is applied a reference voltage Vx obtained by dividing the constant voltage Vcc with resistors $R_7$, $R_8$. The comparator CM has an output terminal joined to a power amplifier 60 for energizing a control solenoid $SL_1$ of a vacuum actuator 50. The output terminal of the comparator CM is also connected through a resistor $R_9$ to the constant-voltage source Vcc and through a resistor $R_{10}$ to an integrating capacitor $C_2$. The junction between the resistor $R_{10}$ and the integrating capacitor $C_2$ is connected through a resistor $R_{11}$ to the input terminal of the storage capacitor $C_1$.

The automobile speed control system also has a flip-flop 70 for maintaining one of two states at a time: one state indicating a setting of a constant-speed travel mode and the other a cancelling of the constant-speed travel mode. The flip-flop 70 has input terminals connected respectively to the setting switch $SW_1$, a resume switch $SW_2$, and a cancel switch $SW_3$. The flip-flop 70 includes a NAND gate 71 having an output terminal connected through diodes $D_5$, $D_6$ respectively to the noninverting input terminal of the comparator CM and the integrating capacitor $C_2$, and another NAND gate 72 having an output terminal connected through a power amplifier 80 to a release solenoid $SL_2$ of the vacuum actuator 50.

An acceleration signal generator circuit 90 has a timer circuit 91 which starts operating when the resume switch $SW_2$ is closed, a NAND gate 92 and an inverting gate 93 the output of the gate 92 being fed back to the timer 91. When the resume switch $SW_2$ is closed for an interval of time longer than the time set by the timer circuit 91, the timer circuit 91 produces a signal of high level and the acceleration signal generator circuit 90 produces an acceleration signal of a logic level "L", which is applied through diodes $D_2$, $D_3$ respectively to the base of the transistor $T_1$ and the integrating capacitor $C_2$.

A safety circuit OR gate 100 has input terminals connected to both the resume switch $SW_2$ and the cancel switch $SW_3$ and an output terminal connected to one of the input terminals thereof to provide a feedback loop.

The automobile speed control system thus constructed will operate as follows:

The rate at which the reed switch 10 is repeatedly opened and closed, that is, the frequency of the automobile speed signal, is converted by the F/V converter 20 into a corresponding voltage which is issued as the speed voltage signal Vv.

The automobile speed is memorized as follows: When a storage command signal is applied by closing the setting switch $SW_1$, the transistor $T_1$ is turned off to allow the gate potential in the FET $F_1$ to rise until the latter is conducted between the drain and source thereof. As a result, the source voltage produced by dividing the constant voltage Vcc with the resistors $R_3$, $R_4$ is imposed on one terminal of the capacitor $C_1$ and the gate of the FET $F_2$. Let the source voltage be regarded as a reference voltage Vr, and since the automobile speed voltage Vv is applied to the other terminal of the capacitor $C_1$, the capacitor $C_1$ now stores an electric charge corresponding to a potential difference $|Vv-Vr|$ across the capacitor $C_1$. Upon removal of the storage command signal, the FET $F_1$ is turned off again. The FET $F_2$ has a high input impedance, and thus the terminal of the capacitor $C_1$ connected to the FET $F_2$ is brought into a floating condition, whereupon the charge stored in the capacitor $C_1$ is retained as it was prior to removal of the storage command signal. Assuming that the automobile speed voltage Vv at this time is equal to $Vv_0$, the potential difference V across the capacitor $C_1$ is held at the value $|Vv_0-Vr|$. Accordingly, a voltage $Vv+V$ ($Vv+|Vv_0-Vr|$) is applied to the gate of the FET $F_2$, and a corresponding voltage is issued as the stored voltage $V_M$ from the source of the FET $F_2$. Assuming that the stored voltage right after it has been stored is indicated by $V_{M0}$, the stored voltage $V_M$ will increase as the automobile speed increases and descrease as the automobile speed decreases from the voltage $V_{M0}$.

The voltage Vx produced by dividing the constant voltage Vcc with the resistors $R_7$, $R_8$ is impressed on the noninverting input terminal (+) of the comparator CM in the comparator circuit 40, while the stored voltage $V_M$ is applied to the inverting input terminal (−). Consequently, the output from the comparator CM goes high when $V_M<Vx$, and goes low when $V_M>Vx$. The power amplifier 60 is turned on when the output from the comparator CM is high and turned off when the output from the comparator CM is low.

The voltage Vx is selected to be slightly higher than the reference voltage Vr. The voltage Vx is therefore slightly greater than the voltage $V_M$ immediately after it has been stored, so that the power amplifier 60 will be energized right after the voltage $V_M$ has been stored.

The power amplifier 60 is now driven to energize the control solenoid $SL_1$ of the vacuum actuator 50 for thereby actuating the throttle valve (not shown) in an opening direction. The vacuum actuator 50 is arranged such that the opening of the throttle valve is determined by the period of time during which the control solenoid $SL_1$ is energized.

At the same time, the output signal from the comparator CM is integrated by the resistor $R_{10}$ and the capacitor $C_2$, and the integrated output is fed back to the storage capacitor $C_1$ through the resistor $R_{11}$. This feedback control causes a gradually increasing voltage across the integrating capacitor $C_2$ during energization of the control solenoid $SL_1$ to be added through the resistor $R_{11}$ to the automobile speed voltage Vv indicative of the actual automobile speed, so that the sum voltage is impressed on the storage capacitor $C_1$. Therefore, a signal representative of a speed increase is issued before the automobile speed voltage Vv reaches the storage speed $V_M$ representing the target speed, thus suppressing acceleration and preventing the automobile from being accelerated beyond the target speed. When the automobile speed is too high, the output from the comparator CM goes low, rendering the control solenoid $SL_1$ nonconductive to actuate the throttle valve in a closing direction. Since the integrated voltage from the capacitor $C_2$ is also lowered, a signal is produced indicative of a speed reduction before the actual speed is lowered to the target speed. This prevents the automobile from being decelerated excessively. The charge stored in the integrating capacitor $C_2$ is discharged through the diode $D_7$ when the setting switch $SW_1$ is closed.

The output from the F/V converter 20 is rippled, and so is the feedback signal due to energization and de-energization of the comparator CM. The comparator CM is therefore controlled to produce its output which goes high and low alternately at a fast rate under duty control.

Under normal condition, the output terminal of the NAND gate 71 is kept at a high level and the output terminal of the NAND gate 72 is kept at a low level.

When the cancel switch $SW_3$ is closed at this time, the output terminal of the NAND gate 71 goes low and the output terminal of the NAND gate 72 goes high, rendering the noninverting input terminal of the comparator CM low and discharging the charge stored in the integrating capacitor $C_2$. The power amplifier 80 is then turned on to energized the release solenoid $SL_2$ for thereby releasing the throttle valve. The constant-speed travel mode is now cancelled. When it is thereafter desired to enable the automobile to run at the constant speed prior to the cancelling of the constant-speed travel mode, the resume switch $SW_2$ is closed to render the output of the NAND gate 71 high and the output of the NAND gate 72 low to thereby de-energize the release solenoid $SL_2$ and apply the reference voltage $Vv$ to the comparator CM for keeping the automobile speed at the speed before the mode is cancelled. For a constant-speed travel mode at a newly set speed, the setting switch $SW_1$ should be closed again and the storage voltage $V_M$ should be changed.

When the resume switch $SW_2$ is closed, the timer circuit 91 in the acceleration signal generator circuit 90 starts operating. As long as the resume switch $SW_2$ is closed for an interval of time shorter than the time set by the timer circuit 91, the speed control system operates to bring the automobile speed back to the speed prior to cancelling the constant-speed travel mode. When the resume switch $SW_2$ is closed for a period of time longer than the time set by the timer circuit 91, the acceleration signal generator circuit 90 issues an acceleration signal of a low level. This acceleration signal is applied through the diodes $D_2$, $D_3$ to the base of the transistor $T_1$ and the capacitor $C_2$. Therefore, the transistor $T_1$ is turned off and the FET $F_1$ is turned on to apply the reference voltage $Vr$ to the base of the FET $F_2$. Since the source voltage of the FET $F_2$ is equalized to the reference voltage $Vr$, the comparator CM compares the reference voltage $Vr$ and the divided voltage $Vx$. Because $Vx > Vr$, the output from the comparator CM goes high to energize the control solenoid $SL_1$ of the actuator 50 for increasing the opening of the throttle valve to thereby accelerate the automobile. The automobile is continuously accelerated as long as the resume switch $SW_2$ is closed. When the resume switch $SW_2$ is opened at the time the automobile has reached a desired speed, the transistor $T_1$ is turned on to produce a setting signal, whereupon the automobile speed at that time is memorized to bring the automobile into a constant-speed travel mode. At this time, the capacitor $C_2$ is discharged through the diode $D_3$ to avoid excessive feedback control operation at the time the automobile speed is memorized.

When the cancel switch $SW_3$ is closed while the automobile is continuously increasing its speed, the flip-flop 70 is actuated to cancel the constant-speed travel mode and simultaneously the output of the safety circuit OR gate 100 goes low. Thus, the flip-flop 70 is maintained in the state of cancelling the constant-speed travel mode even when the cancel switch $SW_3$ is opened. This flip-flop state is continued until the resume switch $SW_2$ is opened. The constant-speed travel mode can therefore be cancelled by closing the cancel switch $SW_3$ even when the resume switch $SW_2$ happens to remain closed accidentally while the automobile is running at a constant speed. This can prevent any danger of continued acceleration of the automobile which would result from the malfunction of the resume switch $SW_2$.

A second mode of operation of the speed control system will be described. When the resume switch $SW_2$ is closed and opened, the timer circuit 91 in the acceleration signal generator circuit 90 starts operating at the time the resume switch $SW_2$ is opened. Unless the resume switch $SW_2$ is closed again while the timer circuit 91 is energized, the speed control system operates to bring the automobile speed back to the speed prior to the cencelling of the constant-speed travel mode. When the resume switch $SW_2$ is closed again during operation of the timer circuit 91, the timer circuit 91 produces a signal of high level. Therefore, the acceleration signal generator circuit 90 produces a signal of low level, and the signal is applied to the terminal G of the timer circuit 91 to remain the acceleration signal as it is as long as the resume switch $SW_2$ is closed.

This low-level signal is applied through the diodes $D_2$, $D_3$ to the base of the transistor $T_1$ and the capacitor $C_2$. The transistor $T_1$ is de-energized and the FET $F_1$ is energized, thereby applying the reference voltage $Vr$ to the base of the FET $F_2$. The source voltage $V_M$ of the FET $F_2$ is now equalized to the reference voltage $Vr$, and then the comparator CM compares the reference voltage $Vr$ and the divided voltage $Vx$. Since $Vx > Vr$, the output of the comparator CM goes high to energize the control solenoid $SL_1$ of the actuator 50 for thereby increasing the opening of the throttle valve. The automobile is therefore accelerated and is kept accelerated while the resume switch $SW_2$ is being closed. By opening the resume switch $SW_2$ when the automobile has reached a desired speed, the transistor $T_1$ is turned on to produce a setting signal by which the automobile speed is memorized again to allow the automobile to run in the constant-speed travel mode.

Although a certain preferred embodiment has been shown and described, it should be understood that many changes and modifications may be made therein without departing from the scope of the appended claims.

What is claimed is:
1. An automobile speed control system comprising:
   a comparator circuit for issuing a speed difference signal when there is a difference between an automobile speed signal indicative of an actual automobile speed and an automobile speed setting signal indicative of a desired automobile speed;
   an actuator responsive to said speed difference signal for adjusting the opening of a throttle valve to change the speed of an automobile in order to eliminate said speed difference signal;
   a cancel switch for cancelling a constant-speed travel mode of the automobile;
   a resume switch for resuming the constant-speed travel mode which has been cancelled;
   a timer circuit energizable for a prescribed interval of time in response to the operation of said resume switch while the automobile is running in the constant-speed travel mode;
   an acceleration signal generator circuit for generating an acceleration signal in response to the operation of said resume switch for returning said automobile to said desired speed and wherein said acceleration signal generator circuit issues said acceleration signal after said resume switch has been actuated for a period of time which exceeds said prescribed interval of time;
   whereby after said prescribed interval of time has elapsed, said automobile speed signal provides said automobile speed setting signal indicative of a desired speed for said constant-speed traveling mode and increases the actual speed of said automobile, while said resume switch is actuated.

2. An automobile speed control system according to claim 1, including a safety circuit responsive to actuation of said cancel switch during acceleration of the automobile initiated by said resume switch for interrupting the acceleration initiated by the latter and for disabling the constant-speed travel mode until said resume switch has been turned off.

3. An automobile speed control system comprising:
a comparator circuit for issuing a speed difference signal when there is a difference between an automobile speed signal indicative of an actual automobile speed and an automobile speed setting signal indicative of a desired automobile speed
an actuator responsive to said speed difference signal for adjusting the opening of a throttle valve to change the speed of an automobile in order to eliminate said speed difference signal;
a cancel switch for cancelling a constant-speed travel mode of the automobile;
a resume switch for resuming the constant-speed travel mode which has been cancelled, and circuit means responsive to said resume switch for accelerating the automobile while the latter is running in the constant-speed travel mode after said resume switch has been actuated for a prescribed interval of time; and
a safety circuit responsive to actuation of said cancel switch during acceleration of the automobile initiated by said resume switch for interrupting the acceleration initiated by the latter and for disabling the constant-speed travel mode until said switch has been turned off.

4. An automobile speed control system comprising:
a comparator circuit for issuing a speed difference signal when there is a difference between an actual automobile speed signal indicative of an automobile speed and an automobile speed setting signal indicative of a desired automobile speed;
an actuator responsive to said speed difference signal for adjusting the opening of a throttle valve to change the speed of an automobile in order to eliminate said speed difference signal;
a cancel switch for cancelling a constant-speed travel mode of the automobile;
a resume switch for resuming the constant-speed travel mode which has been cancelled;
a timer circuit energizable for a prescribed interval of time in response to the operation of said resume switch while the automobile is running in the constant-speed travel mode;
an acceleration signal generator circuit for generating an acceleration signal in response to the operation of said resume switch for returning said automobile to said desired speed and wherein said acceleration signal generator circuit issues the acceleration signal after said resume switch is actuated again while said timer circuit is energized;
whereby the acceleration signal increases the speed of the automobile and said automobile speed signal sets said automobile speed setting signal for said constant-speed travel mode when said resume switch is subsequently actuated.

* * * * *